US011353637B2

(12) United States Patent
Chen

(10) Patent No.: US 11,353,637 B2
(45) Date of Patent: Jun. 7, 2022

(54) TWO-PIECE OPTICAL PRISM

(71) Applicant: NATIONAL YANG-MING UNIVERSITY, Taipei (TW)

(72) Inventor: How-Foo Chen, Taipei (TW)

(73) Assignee: NATIONAL YANG-MING UNIVERSITY, Taipei (TW)

( * ) Notice: Subject to any disclaimer, the term of this patent is extended or adjusted under 35 U.S.C. 154(b) by 710 days.

(21) Appl. No.: 16/152,430

(22) Filed: Oct. 5, 2018

(65) Prior Publication Data

US 2020/0110201 A1    Apr. 9, 2020

(51) Int. Cl.
*G02B 5/04*    (2006.01)
*G01N 21/59*    (2006.01)

(52) U.S. Cl.
CPC ............... *G02B 5/04* (2013.01); *G01N 21/59* (2013.01); *G01N 2021/5903* (2013.01); *G01N 2201/068* (2013.01)

(58) Field of Classification Search
CPC .. G02B 5/06; G02B 5/04; G02B 2006/12114; G02B 5/008; G02B 6/1226; G01N 21/553; G01N 21/648; G01N 21/658; G01N 21/552; G01N 21/554; G01N 2021/5903; G01N 2201/06
See application file for complete search history.

(56) References Cited

U.S. PATENT DOCUMENTS

| | | | | |
|---|---|---|---|---|
| 5,946,084 A * | 8/1999 | Kubulins | ............. | G01N 21/431 356/136 |
| 6,466,323 B1 * | 10/2002 | Anderson | ............. | G01N 21/553 356/445 |
| 6,535,283 B1 * | 3/2003 | Heffels | ............. | G01N 21/8507 250/341.8 |
| 6,704,052 B1 * | 3/2004 | Togino | ............. | G02B 17/0848 348/340 |
| 9,703,022 B2 * | 7/2017 | Cagran | ............. | G02B 1/02 |
| 10,082,462 B2 * | 9/2018 | Suzuki | ............. | G01N 21/59 |
| 2012/0081698 A1 * | 4/2012 | Christian | ............. | G01N 21/43 356/128 |

* cited by examiner

*Primary Examiner* — Ephrem Z Mebrahtu
(74) *Attorney, Agent, or Firm* — Leong C. Lei

(57) ABSTRACT

A two-piece optical prism includes a prism having a groove and prism having arc faces, where the prism having a groove has at least one first arc face and groove having at least one second arc face, and the prism having arc faces is placed in the groove of the prism having a groove and has at least one third arc face. The present invention can be used in the surface plasmon resonance optical system for the angle, range adjustment and control of incident light (e.g. laser light), capable of constituting an optical wide-angle, multi-angle incident system to carry out the wide-angle, multi-angle scanning detection of surface plasmon resonance, increasing the system dynamic detection range and sensitivity; and further reducing a detection chip.

9 Claims, 5 Drawing Sheets

TWO-PIECE OPTICAL PRISM

(a) TECHNICAL FIELD OF THE INVENTION

The present invention relates to an optical prism, and more particularly to a two-piece optical prism.

(b) DESCRIPTION OF THE PRIOR ART

Surface plasmon resonance test is a highly sensitive test currently broadly used in a variety of fields, and has started to invest in biochemistry related tests in recent years, which include, but are not limited to, biomedical testing devices, immune response testing, and antibody-antigen binding dynamic detection. The testing principle is to obtain a surface refractive index change by changing an angle that light is incident in the surface of surface metal, where the surface refractive index change may represent surface molecular bonding, configuration changes, or other possible changes.

Surface plasmon resonance system may be divided into angle, intensity, wavelength and phase detection modality, where the incident light must be carried out with a several adjustments so as to achieve the best test sensitivity if the intensity and phase are used to design. Therefore, the test range and sensitivity will be much limited when the incident angle of the test system cannot be adjusted. In addition, although the wavelength test modality can be carried out at a fixed angle, the test sensitivity is worse than the intensity and phase modalities; the angle detection modality must be carried out with the adjustment of the incident angle.

In Taiwan Patent NO. I480535 issued to the inventor of the present invention, the prism reduces the system volume effectively, but there are still some parts needed to improve, for example, the design can still be further reduced in the combination of it and the detection chip in order to be used conveniently. In addition, the design of the above patent will limit the size and shape of the detection point, which might cause difficulty on a several test designs.

SUMMARY OF THE INVENTION

The main object of the present invention is to provide a two-piece optical prism, capable of being used in the surface plasmon resonance optical system for the angle, range adjustment and control of incident light (e.g. laser light), capable of constituting an optical wide-angle, multi-angle incident system to early out the wide-angle, multi-angle scanning detection of surface plasmon resonance, increasing the system dynamic detection range and sensitivity, and further reducing a detection chip.

To achieve the object mentioned above, the present invention is to provide a two-piece optical prism, including a prism having a groove and prism having arc faces, where the prism having a groove has at least one first arc face and groove having at least one second arc face, and the prism having arc faces is placed in the groove of the prism having a groove and has at least one third arc face.

DETAILED DESCRIPTION OF THE PREFERRED EMBODIMENTS

Figure 1:
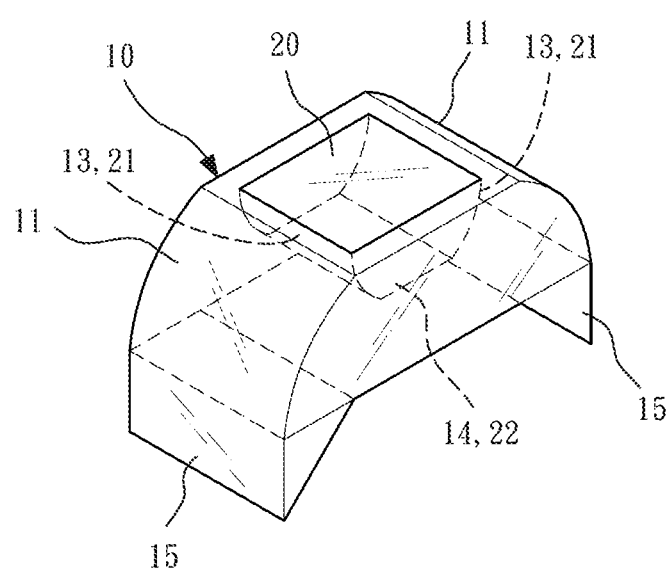
FIG. 1 is a perspective view of the present invention.
Figure 2:
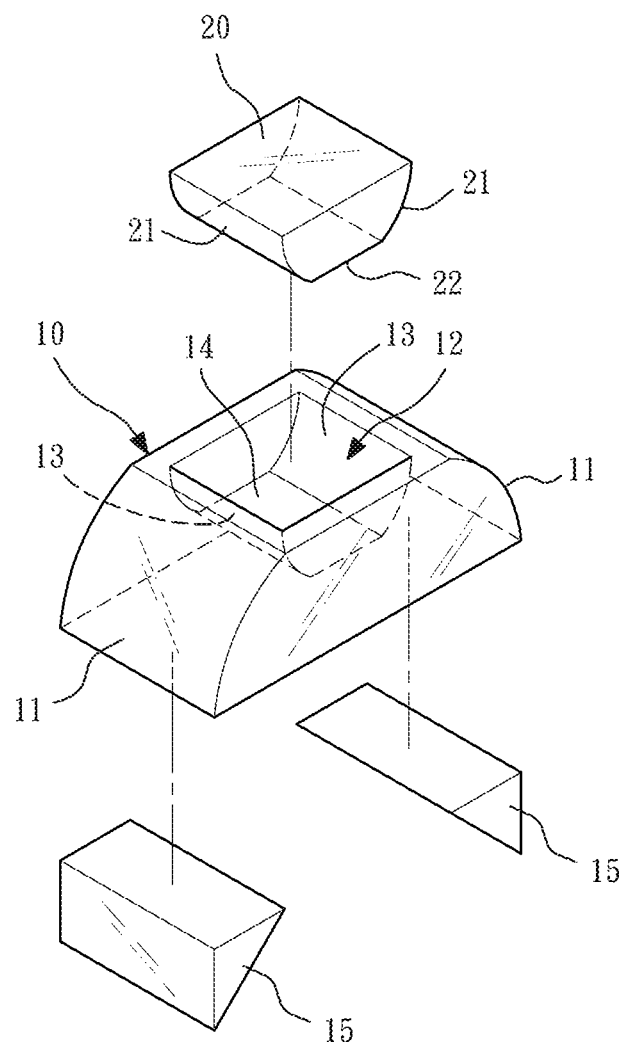
FIG. 2 is an exploded view of the present invention.
Figure 3:
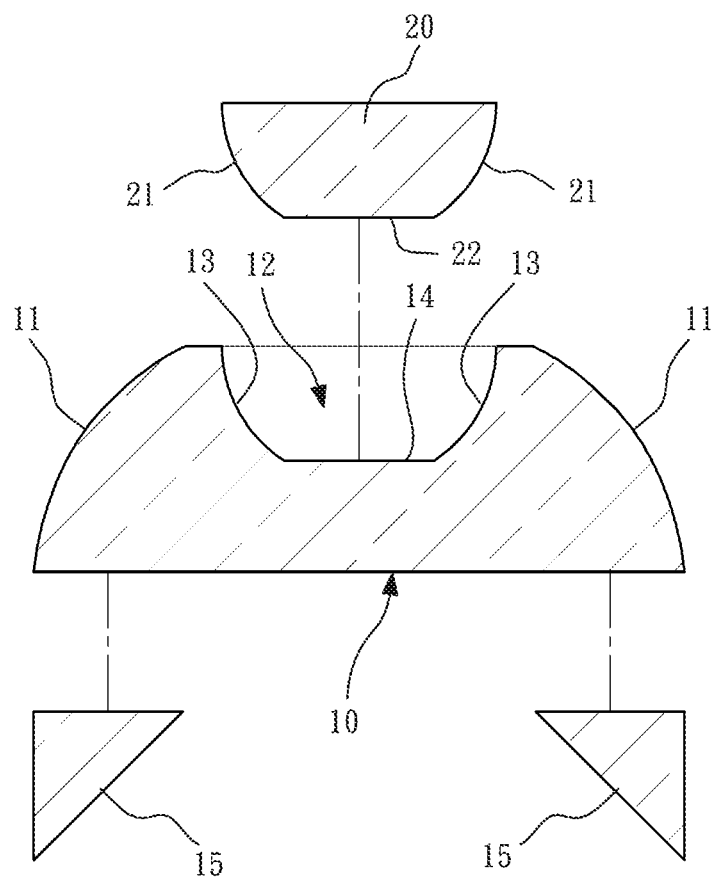
FIG. 3 is a cross-sectional view of FIG. 2.

Referring to FIGS. 1 to 3, a prism 10 having a groove of the present invention, in a preferred embodiment, has two arc faces 11 and a groove 12, the two sides of which respectively have a second arc face 13.

The above first arc face 11 is a paraboloid.
The above first arc face 11 is a one-dimensional paraboloid.
The above groove 12 is defined by the two second arc faces 13 and a plane face 14 adapted to connect the two second arc face 13 to each other after a semi-cylinder is cut with a plane surface.

The two sides of the bottom of the above prism 10 respectively have a triangular prism 15 adapted for light reflection.

A prism 20 having arc faces of the present invention, in a second preferred embodiment, is adapted to operate in coordination with the above prism 10 having a groove, the prism 20 has two third arc faces 21.

Figure 5:
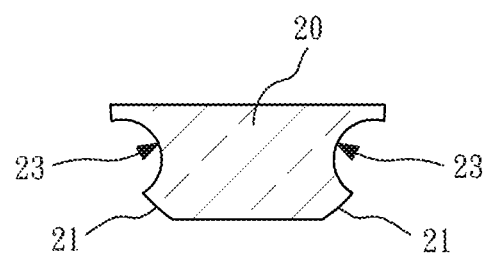
FIG. 5 is a cross-sectional view of another structure of a prism having arc faces of the present invention.

The above prism 20 is formed by cutting a plane surface on a semi-cylinder to have two third arc faces 21 and plane face 22 adapted to connect the two third arc faces 21 to each other. Referring to FIG. 5, each third arc face 21 has a fourth concave arc face 23.

A two-piece optical prism of the present invention, in a third preferred embodiment, includes: a prism 10 having a groove, having two first arc faces 11 and a groove 12 having two second arc faces 13; and a prism 20 having arc faces, placed in the groove 12 of the prism 10 and having two third arc faces 21.

The components and the combination thereof of the present invention has been described as above, and the use features and effects of the present invention will then be described as the following.

Figure 4:
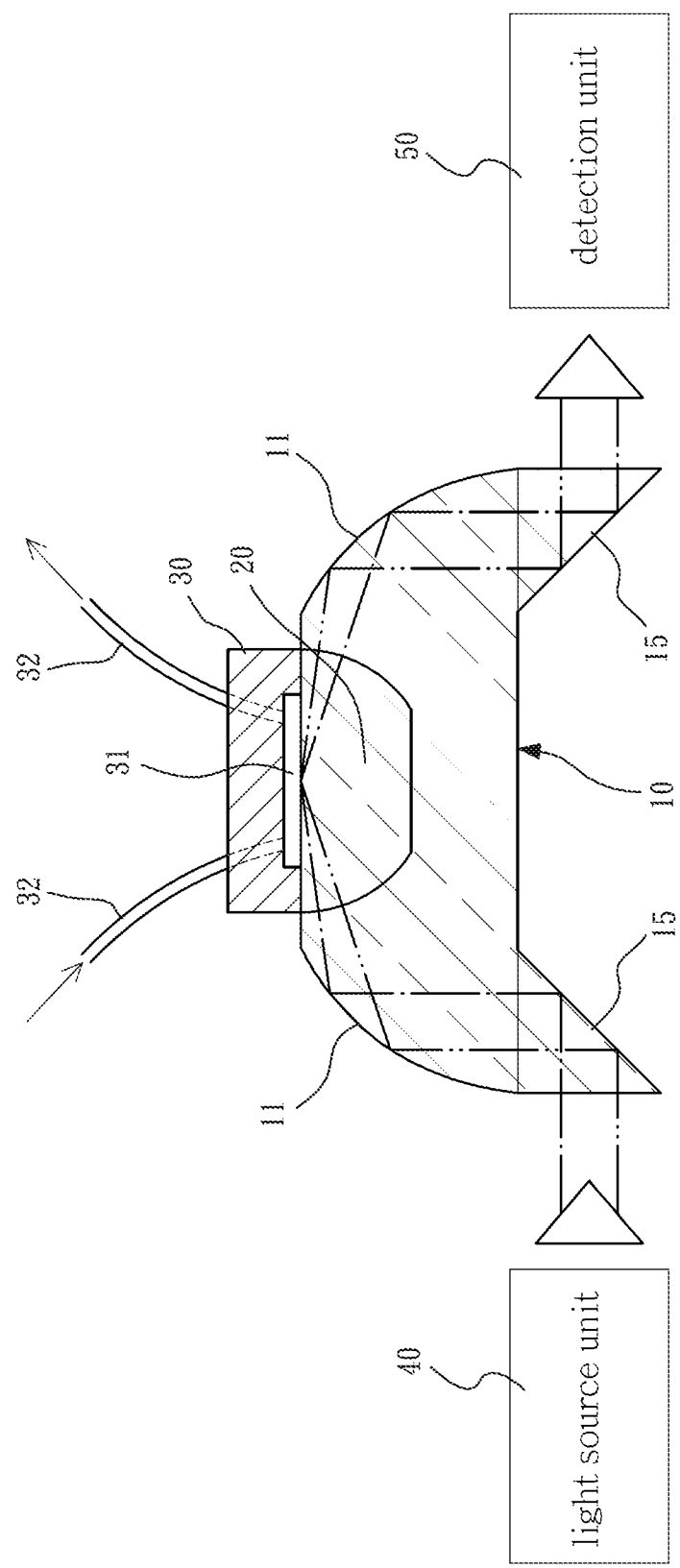
FIG. 4 shows a preferred embodiment of the present invention in a use state.

Referring to FIG. 4, a flow path unit 30 is configured on the prism 20 upon the implementation of the present invention, where the flow path unit 30 has an accommodation groove 31 adapted to accept a sample such as liquid sample. Furthermore, the flow path unit is provided with two flow paths 32 adapted to input a liquid sample into the accommodation groove 3 for detection and discharge it out after detection.

Light emitted from a light source unit 40 is generated into the light of total internal reflection through the triangular prism 15 and first arc face 11 to the center position of the upper side of the prism 20 to generate surface plasmon resonance so as to detect the sample. Thereafter, the reflected light is generated into the light of total internal reflection through the first arc face 11 on the other side to the triangular prism 14 on the other side to generate the light of total internal reflection to a detection unit 50 for the data analysis of detection signals.

The present invention can be used in the surface plasmon resonance optical system for the angle, range adjustment and control of incident light (e.g. laser light), capable of constituting an optical wide-angle, multi-angle incident system to carry out the wide-angle, multi-angle scanning detection of surface plasmon resonance, increasing the system dynamic detection range and sensitivity, and further reducing a detection chip.

Conventional optical systems are mostly adopted with a mirror coating reflection way and structure to adjust and control an incident angle. But, the present invention uses the triangular prisms 15, the prism 10 having a groove and the prism 20 having arc faces to generate total internal reflection, capable of simplifying manufacture flow, reducing the production cost without needing extra coating process and equipment.

Referring to FIG. 5 again, the fourth arc face 23 of the present invention is used to change original focus light into parallel light, thereby providing face light for the sample detection to increase the detection sample range and detection speed so as to improve the detection efficiency effectively.

I claim:

1. A prism having a groove, the prism having at least one first arc face, the groove having at least one second arc face; wherein the at least one first arc face is shaped to provide total internal reflection for light incident into the prism so as to directly reflect the light into the groove, and wherein an additional arc face is provided on the prism such that the at least one first arc face and the additional arc face are arranged on two opposite sides of the groove and separated from each other by the groove, and the additional arc face is shaped to receive light transmitting from the groove and redirect the light so received to leave the prism.

2. The prism having a groove according to claim 1, wherein said first arc face is a paraboloid.

3. The prism having a groove according to claim 2, wherein said first arc face is a one-dimensional paraboloid.

4. The prism having a groove according to claim 1, wherein said groove is defined by two second arc faces and a plane face connecting said two second arc faces to each other after a semi-cylinder is cut with a plane surface.

5. The prism having a groove according to claim 1, wherein one side of a bottom of said prism has a triangular prism, which is adapted to reflect light into the prism.

6. A prism having arc faces, adapted to operate in coordination with said prism having a groove according to claim 1, said prism having arc faces having at least one third arc face.

7. The prism having arc faces according to claim 6, wherein said prism has two third arc faces and a plane face connecting said two third arc faces to each other after a semi-cylinder is cut with a plane surface.

8. The prism having arc faces according to claim 6, wherein said third arc face has a fourth arc face, wherein the third arc face is a convex arc surface and the fourth arc face is a concave arc surface formed in the convex arc surface and converts the light incident into the prism into parallel light.

9. A two-piece optical prism, comprising:
a first prism having at least one first arc face and a groove having at least one second arc face; and
a second prism having arc faces and placed in said groove of said first prism, and said second prism having arc faces having at least one third arc face;
wherein the at least one first arc face is shaped to provide total internal reflection for light incident into the first prism so as to directly reflect the light into the second prism placed in the groove, and wherein an additional arc face is provided on the first prism such that the at least one first arc face and the additional arc face are arranged on two opposite sides of the groove and separated from each other by the groove, and the additional arc face is shaped to receive light transmitting from the second prism placed in the groove and redirect the light so received to leave the first prism.

* * * * *